United States Patent [19]

Seaver

[11] Patent Number: 5,383,048

[45] Date of Patent: Jan. 17, 1995

[54] STRESS-OPTICAL PHASE MODULATOR AND MODULATION SYSTEM AND METHOD OF USE

[76] Inventor: George Seaver, P.O. Box 401, Cataumet, Mass. 02534

[21] Appl. No.: 12,576

[22] Filed: Feb. 3, 1993

[51] Int. Cl.[6] .............................. G02B 5/14; H04B 9/00
[52] U.S. Cl. ................................... 359/279; 359/183; 385/3
[58] Field of Search ............... 385/3; 359/48, 183, 359/240, 279, 285; 372/26

[56] References Cited

U.S. PATENT DOCUMENTS

| | | | |
|---|---|---|---|
| 3,966,326 | 6/1976 | Brull | 356/114 |
| 4,454,418 | 6/1984 | Walker | 250/227 |
| 4,529,876 | 7/1985 | Walker | 250/227 |
| 4,757,195 | 7/1988 | Katagiri et al. | 250/231 P |
| 4,792,207 | 12/1988 | Shaw et al. | 359/285 |
| 4,793,676 | 12/1988 | Risk | 359/279 |
| 4,970,385 | 11/1990 | Tatsuno et al. | 250/225 |
| 5,016,957 | 5/1991 | Seaver | |
| 5,095,515 | 3/1992 | Seaver | |

*Primary Examiner*—Nelson Moskowitz
*Attorney, Agent, or Firm*—Richard P. Crowley

[57] ABSTRACT

A stress-optical phase modulator and modulation system, and method of use of the same is described. The stress-optical phase modulator comprises a source for providing optical beams, a photoelastic optical material, and a means for applying mechanical force to the optical material. The mechanical force so applied creates a uniform stress within the optical material and results in a change in its index of refraction. An optical beam passing through the stressed optical material undergoes a phase change and is recovered as a phase modulated optical beam. Components may be added to the stress-optical phase modulator to produce temperature-compensated and intensity-modulated optical beams.

19 Claims, 1 Drawing Sheet

STRESS-OPTICAL PHASE MODULATOR AND MODULATION SYSTEM AND METHOD OF USE

BACKGROUND OF THE INVENTION

Phase modulation of an optical beam finds important usage in interferometry, fiber-optic gyros and sensors, switchable lenses, reconfigurable highly parallel optical interconnects, phase and phase gradient array beam steering (LADAR), as well as in other optical devices.

Presently, phase modulation is accomplished either by winding hundreds of meters of optical fiber around a piezoelectric cylinder or by electro-optically changing the index of refraction in electro-optic materials such as Nematic Liquid Crystals or Lithium Niobate. Both present approaches to phase modulation have disadvantages. Use of the piezoelectric cylinder is bulky due to the amount of optical fiber required for phase modulation and is not very sensitive. The electro-optical change in the index of refraction of optical materials is plagued by high losses, low throughput power, single polarization, temperature sensitivity and high costs.

Yet, a main advantage of optics and optical devices is their electromagnetic passivity, that is, the nonreactivity of waves of photons with each other or with electromagnetic waves. Thus, to find a new, more sensitive, and less bulky method of accomplishing phase modulation in optical materials is desirable.

Unfortunately, the electromagnetic passivity of optics works to a disadvantage when one attempts to alter the position or phase of an optical wave. Attempts at optical wave modulation include a method of electrically changing the index of refraction of the material through which the beam is propagated. Results to date have produced a small amount of optical wave modulation which operates on only a single mode and polarization and still incurs high losses.

In U.S. Pat. No. 5,016,957, columns 2, 3 and 4, lines 0–68, and column 5, lines 0–60 inclusive, issued May 21, 1991, and U.S. Pat. No. 5,095,515, columns 2, 3, and 4, lines 0–68, and column 5, lines 0–60 inclusive, issued Mar. 10, 1992, hereby incorporated by reference, stress-optical switches made from photoelastic, transparent optical materials were described. The optical material was subjected to a force that formed a mechanical stress gradient and a resultant non-uniform index of refraction gradient within the material. The index of refraction gradient so formed altered the optical path of the optical beam passing through the optical material to form an optical switch. However, stress-optical switches did not achieve phase modulation.

SUMMARY OF THE INVENTION

The present invention relates to optical wave phase modulation. In particular, the invention describes a stress-optic phase modulator and modulation system, and a method for using the same.

The stress-optic phase modulation system comprises a source for providing one or more optical beams to be phase modulated, a photoelastic optical material having one or more inlet windows for receiving an optical beam and one or more outlet windows for recovering a phase modulated optical beam, and a mechanical force means to produce a uniform stress or stress change within the optical material that changes the index of refraction of the optical material and phase modulates the optical beam. This effect on the index of refraction within the optical material is significantly larger than a similar effect created by application of voltage to E-O materials for reasonable driving forces. Stress-optical phase modulation provides a cost effective method of optical beam phase modulation operable in more than one mode and polarization. Minimal loss occurs even while handling high optical throughput power, and electrical power consumption is low.

Any light source may be utilized to provide one or more optical beams for input to the stress-optical phase modulation system. Sources include, for example, lasers and visual light generators whose beams may be directed at a stress-optical phase modulator.

The stress-optic phase modulator utilizes a free-wave device made from photoelastic compound glasses or plastics as described for stress-optics switching in U.S. Pat. No. 5,016,957, column 3, lines 0–47 inclusive, issued May 21, 1991, and U.S. Pat. No. 5,095,515, column 3, lines 0–47 inclusive, issued Mar. 10, 1992, hereby incorporated by reference. Such devices are low-loss, polarization-insensitive, non-dispersive, and of an order of one microsecond in speed of switching.

The stress-optic phase modulation system of the present invention includes an optical material for changing the optical path length of one or more optical beams. Such optical material is generally a photoelastic, transparent mass, more particularly a slab or rectangular block, whose index of refraction changes with mechanical, electrical, photonic or any type of stress that is applied. The transparency of the stress-optic material permits the optical beam to pass between the inlet and outlet windows.

Electrical, photonic, mechanical or other force means are used to apply a predetermined force or bending moment to the stress-optical transparent material of the stress-optical phase modulation system in order to create a uniform stress within the material. Generally, such force is applied in a direction perpendicular to the direction of propagation of the optical beam through the optical material. A force may be supplied sufficient to stretch the optical material and thereby increase the velocity of the optical beam propagated through the optical material. Alternatively, a force may be supplied sufficient to compress the optical material and so to decrease the velocity of the optical beam passing through the optical material.

The stress channel, that is, the area of uniform stress within the optical material, undergoes a change in the index of refraction of the optical material as a result of the force applied. An optical beam passing through the stress channel experiences a change in optical path length that corresponds with the change in the index of refraction. Alteration of the optical path length of the optical beam changes the phase of the optical beam in the outlet window from an unstressed to a stressed or phase-modulated optical beam. Force has been applied sufficient to cause a substantially uniform change in the index of refraction of an optical material of typically 0.5% and to produce a resulting change in transmitted optical beam phase of typically five wavelengths at 633 nm.

Components may be added to the stress-optic phase modulation system to enhance the capabilities of the system. For example, beam splitter and beam coupler means may be added to provide compensation adjustments within the system.

In one embodiment, a source to provide optical beams produces a single optical beam which then is sent through a beam splitter device. The beam splitter means produces a plurality of optical beams, for example, two identical coherent optical beams which are received into separate inlet windows on a side of the optical material. One such beam passes through an unstressed portion of the optical material, while its sister beam passes through a stressed portion of the optical material. On exiting the stress-optic phase modulation system, the phase modulated optical beam and non-modulated optical beam are recombined by a beam coupler means in which constructive or destructive interference of their wave phases occurs. The final result is a compensated, stress-optic intensity modulated optical beam.

Other more complex embodiments may comprise three or more channels created within the optical material comprising the stress-optic phase modulation system. Any number of these channels are stressed and at least one of these channels is unstressed. Inlet windows are created within a side of the optical material for receiving optical beams propagated from one or more optical beam sources. A beam splitter means is supplied for splitting at least one sensing-optical beam, for example, a temperature-sensing optical beam. One or more of the split optical beams passes through an unstressed channel such as a temperature-insensitive tunnel. Such a tunnel may be tube-like device comprising a temperature-insensitive material, for example, super invar, and may contain air, a vacuum, another gas, or other appropriate testing medium. Other split coherent optical beams pass through one or more stressed channels of the optical material as does a main, unsplit optical beam. Upon exiting the outlet windows of the optical material, an original optical beam which was split, such as a temperature-sensing optical beam, is now recombined by a beam coupler means. The recombined intensity-modulated optical beam formed from an unmodulated sensing beam and a phase modulated beam is captured by a photodetector means, for example, one that may produce a voltage. The voltage is sent back through a feedback means, such as a loop, to adjust input into a force means, thereby to compensate for changes such as in ambient temperature changes within the system.

Other components added to the stress-optical phase modulation system include photodetectors, electrodes, and photostrictive, electrostrictive and magnetostrictive plates for applying stress to the optical material. For example, application of two thin electrostrictive plates on either side of an optical material forms a potential stress sandwich area or stress channel within the optical material. Such plates are made from materials like lead magnesium niobate (PMN) and are affixed to an optical material by adhesives or powdered glass frits. Photostrictive plates are made, for example, from N-isopropylacrylamide coupled with light-sensitive chromophores and trisodium salt of copper chlorophyllin. Such plates provide an all-optical embodiment of the present invention sensitive to stress provided by photons.

Other options for the fabrication of the present invention include the use of athermal glass as the optical material to produce a temperature-insensitive stress-optical phase modulator. Inclusion of a structural means such as one or more ribs running the length or substantially the length of one of the plates in the center of the system prevents flexure in the optical material in the direction of optical beam propagation. Thin film and vapor deposition techniques with lead magnesium niobate (PMN) or lead titanate zirconate (PZT) comprising micron thick electrostrictive film plates deposited on stress-optical material channels have been used to fabricate miniature stress-optical phase modulators.

Other embodiments of the stress-optical phase modulation system include any variety of arrangements of one or more stress-optical phase modulators. For example, stacking of stress-optical phase modulators in series, in parallel, or perpendicular to one another can achieve, for example, steering of large coherent laser beams or reconfiguring of highly parallel computer optical interconnections.

Characteristics of the stress-optic phase modulation system depend upon the nature of the material used to fabricate the device. One embodiment of the present invention permits modulation of only one polarization of an optical beam, while another embodiment allows both optical beam polarizations to be modulated. Such differences between embodiments depend upon a difference between the molecular physics of the optical material chosen for the stressed channel of the system and the resultant degree of anisotropy of the local strain field created by the applied stress. For example, when quartz or polycarbonate plastic are used as the optical material, only the polarized component of the optical beam parallel to the stress is substantially effected. However, the use of high lead-content glass or acrylic or polystyrene plastic as the optical material results in phase modulations of both polarizations of the optical beam.

Important parameters of the stress-optic phase modulation system include the stress-optical material, its thickness, and applied stress. A phase change for the slab or rectangular configuration of the device is $P = 2\pi L C S / n T$, where L is optical path length, C is stress-optic constant, S is stress change, n is the index of refraction and T is optical wavelength.

The method of stress-optics phase modulation comprises providing an optically transparent stress-optical material with an index of refraction that changes with applied stress and having both inlet and outlet windows; introducing an optical beam into the inlet window from an optical source; applying a predetermined force or bending moment to the stress-optical material to create a uniform stress within the stress-optical material, thus substantially uniformly changing the index of refraction of the stress-optical material in a predetermined way and resulting in a change in the phase of the optical beam issuing from the outlet window from a zero stress value to a stressed optical beam phase value; and passing the phase modulated optical beam from the outlet window to an optical receptor means positioned to receive the optical beam emerging from the outlet window.

The invention will be described for purposes of illustration only in connection with certain preferred embodiments; however, it is recognized that various changes, modifications, improvements and additions may be made to the stress-optical phase modulator, the optical materials and methods as described by the applicant, all falling within the spirit and scope of the invention.

DESCRIPTION OF THE EMBODIMENTS

Figure 1:
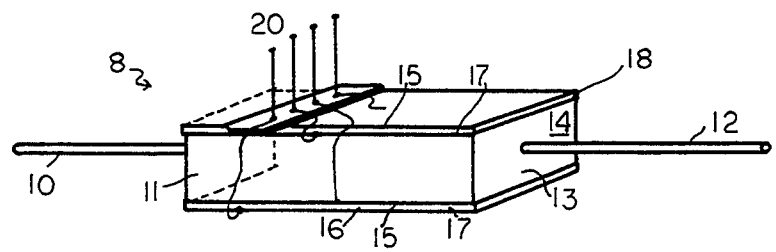
FIG. 1 is a schematic view of a basic stress-optical phase modulator of the present invention.

FIG. 1 shows a stress-optical phase modulator comprised of a generally rectangular slab of transparent stress-optical material 14 such as glass or polymers, having an inlet window 11 at one end and an outlet window 13 at an opposite end.

An optical beam 10 is incident at the inlet window 11, passes through the stress-optical material 14, and exits at the outlet window 13. The stress-optical material 14 through which the optical beam 10 passes experiences stress by the contraction and expansion of a force means, for example, such as thin electrostrictive plates 16 and 18 affixed to the stress-optical material 14. A voltage 20 applied to create an electrical field between electrodes 15 and 17 causes expansion and contraction of plates 16 and 18.

Orientation of the electrical field determines whether plates 16 and 18 will expand or contract. A force typically is applied to an optical material in a direction perpendicular to the direction of propagation of an optical beam. Sufficient force can be supplied to compress the optical material to decrease the velocity of an optical beam passing through the optical material or to stretch the optical material to increase the velocity of an optical beam passing through the optical material.

A change in stress brought about within the stress-optical material 14 produces a substantially uniform change in the index of refraction along an optical path between the inlet window 11 and the outlet window 13, thereby changing both transit time and phase of a phase modulated output beam 12 at the exit window 13 in comparison to the transit time and phase of an optical beam passing through an unstressed optical material channel. Sufficient force may be applied to cause stress within the optical material to produce a substantially uniform change in the index of refraction of the optical material of typically 0.5% and a change in phase of an optical beam of up to about five wavelengths at 623 nm.

Figure 2:
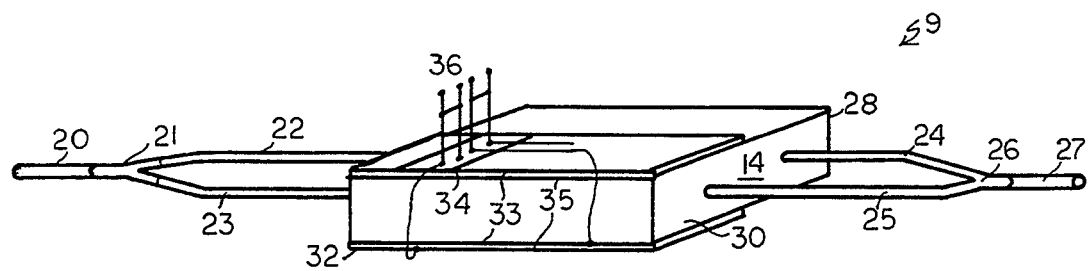
FIG. 2 is a schematic of the stress-optical amplitude modulator of the invention.

FIG. 2 shows the stress-optical phase modulator 8 of FIG. 1 expanded to two or more channels to create a temperature-compensated optical intensity modulator 9. An optical beam 20 encounters a beam splitter means 21 producing optical beams 22 and 23 of coherent and equal intensity. Optical beams 22 and 23 pass through unstressed section 28 and stressed section 30 respectively of the stress-optical phase modulator 9, and exit as a nonmodulated optical beam 24 and a phase modulated optical beam 25 which encounter an optical beam coupler means 26. The optical beam coupler means 26 recombines optical beams 24 and 25 and causes the optical beams 24 and 25 to constructively or destructively interfere with one another to produce an intensity modulated optical beam 27.

To create intensity modulation within a stress-optical phase modulator 9, a force means creates a stress on a section or channel of stress optical material, 14. The force means may be, for example, a voltage 36 which causes an electrical field to appear between electrodes 33 and 35. The electrical field so created results in expansion or contraction of electrostrictive plates 32 and 34 thereby imposing a stress on section 30 of the stress-optical material 14. A substantially uniform change in the index of refraction of the stress-optical material 14 results within section 30 of the stress-optical phase modulator 9. However, no similar change in stress or in index of refraction occurs for section 28 of the stress-optical phase modulator 9. The imposed stress and resulting substantially uniform change in the index of refraction within section 30 of the stress-optical phase modulator 9 change the phase of optical beam 25 compared to the phase of optical beam 24. Since both optical beams 22 and 23 are propagated through the same stress-optical material 14 and subjected to identical temperature changes, a temperature-induced phase change has no effect on intensity modulation within optical beam 27.

Figure 3:
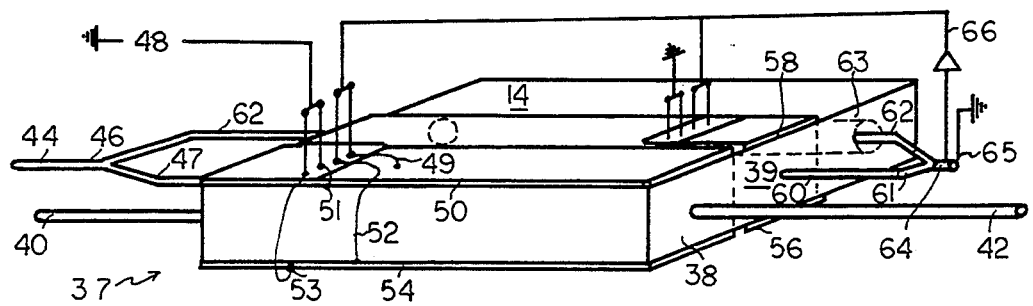
FIG. 3 is a schematic of the temperature-compensated stress-optical phase modulator of the invention.

FIG. 3 shows the basic stress-optical phase modulator 8 of FIG. 1 expanded to three or more channels to create a stress-optical compensated phase modulator 37. An optical beam 40 passes through section 38 of the stress-optical material 14 and is phase modulated by both an imposed stress from a force means, such as for example, electrostrictive plates 50 and 54 as well as by ambient temperature changes in the stress-optical material 14. The optical beam 40 exits as a phase modulated optical beam 42. Another compensating optical beam 44 is split into two coherent, equal optical beams 47 and 62 by a beam splitter means 46. Optical beam 62 travels through a constant length tunnel 63 made of a material insensitive to the factor compensated. For example, the tunnel may be made of temperature-insensitive material that contains either air or a vacuum. Optical beam 62 exits as a phase reference optical beam 62, such as for example, a temperature-insensitive phase reference optical beam.

Optical beam 47 passes through section 39 of the stress-optical material 14 and is phase modulated in one direction by a change in the stress-optical material 14, such as by a change in ambient temperature. Optical beam 47 is also phase modulated in a second direction by a feedback means such as, for example, a voltage 66, applied to a force means such as electrostrictive plates 56 and 58. The electrostrictive plates 56 and 58 create stress and a resultant substantially uniform change in index of refraction within section 39 of the stress-optical material 14, thereby changing the transmission speed of optical beam 60. A phase modulated optical beam 60 exits section 39 of the stress-optical material 14 and is recombined with reference optical beam 62 by a coupler means 61. Constructive or destructive interference occurs between the phase modulated optical beam 60 and the unmodulated reference optical beam 62 at the coupler means 61 which produces a compensated intensity modulated optical beam 64.

The compensated intensity modulated optical beam 64 is detected by a photodetector means 65 which produces a signal such as a voltage 66. Such voltage 66 is connected to the electrostrictive plates 56 and 58, thereby forming a feedback means and restoring the phase of the optical beam 60 to its original relationship with the reference optical beam 62 as it existed before a compensation change, such as for example for temperature, occurred. The same feedback signal, such as a voltage 66, is applied to a force means such as electrodes 49 and 52 of electrostrictive plates 50 and 54, respectively, to increase or decrease an effect of an external force signal such as a voltage signal 48 applied to electrodes 51 and 53 of electrostrictive plates 50 and 54, thereby subtracting out the temperature component of a total phase change realized in phase modulated optical beam 42.

What is claimed is:

1. A method for phase modulation of an optical beam, which method comprises:

a) providing an optical beam;

b) providing a transparent, stress-optical material having an inlet window and an outlet window, the material chosen so as to change uniformly its index of refraction in response to a homogeneous stress field;

c) introducing the optical beam into the inlet window of the optical material for receiving the beam through the optical material;

d) applying a predetermined force to the optical material to create uniform stress within and throughout the optical material sufficient to form a substantially uniform change in an index of refraction throughout the optical material to a selected index of refraction to effect a change in the velocity of the optical beam through the optical material; and e) recovering a stress-induced, phase modulated optical beam from an outlet window of an optical material.

2. The method of claim 1 wherein the force applied to an optical material is sufficient to stretch the optical material to increase the velocity of the optical beam propagated through the optical material.

3. The method of claim 1 wherein the force applied to an optical material is sufficient to compress the optical material and to decrease the velocity of the optical beam propagated through the optical material.

4. The method of claim 1 wherein the force applied to an optical material is sufficient to change the index of refraction of the optical material up to 0.5 percent.

5. The method of claim 1 wherein the force applied is sufficient to produce a change in a transmitted optical beam phase of up to about five wavelengths at a wavelength of 633 nm.

6. The method of claim 1 which includes applying the predetermined force substantially perpendicular to the path of the optical beam.

7. The method of claim 1 which includes providing an optical material having a piezoelectric or electro restrictive plate means secured thereto and applying electrical power to the piezoelectric or electro restrictive plate means to provide the predetermined force and the uniform stress to the optical material.

8. The method of claim 1 wherein the method includes:

a) dividing the optical beam into a plurality of separate optical beams;

b) creating one or more uniform stress channels and one or more unstressed channels within the optical material and applying a predetermined force to one or more stress channels, the stressed and unstressed channels having different indices or refraction to provide at least one stressed phase modulated optical beam and at least one unstressed non-phase modulated optical beam; and c) recombining at least one of the stressed phase modulated optical beams and at least one of the unstressed non-phase modulated optical beams, thereby producing a compensated stress-optic intensity modulated optical beam.

9. The method of claim 8 which includes:

a) creating one or more uniform stress channels in the optical material by the use of piezoelectric means;

b) receiving one or more of the stress phase modulated optical beams in a photo detector means to generate an electrical signal; and c) feeding an electrical signal from the photo detector means back to the piezoelectric means to regulate the predetermined force to provide for a compensated, stress-modulated optical beam.

10. The method of claim 9 which includes forming at least one of the channels in the optical material as a tunnel containing a temperature insensitive material to provide a temperature-compensating modulated optical beam.

11. A method for providing a compensated, phase modulated optical beam, which method comprises:

a) providing a stress optical material having an inlet window and an outlet window, the material adapted to change its index of refraction uniformly in response to uniform stress;

b) passing a first optical beam in a first channel of the material from the inlet to the outlet windows;

c) applying to said first section through a first force means secured to a first channel of the optical material a predetermined force sufficient to form a substantially uniform change in the index of refraction of said first channel to recover a first phase modulated optical beam from the outlet window;

d) dividing a second optical beam into two equal, coherent beams 2A and 2B;

e) passing optical beam 2A in a second channel of the optical material through a tunnel section composed of a material insensitive to the factor to be compensated to recover from the outlet window a phase reference optical beam;

f) passing optical beam 2B in a third channel of the optical material to the outlet window, which optical beam 2B is phase modulated by the factor to be compensated;

g) combining the factor phase modulated optical beam 2B and the phase reference optical beam 2A to provide a compensated, modulated outlet optical beam;

h) detecting the compensated, modulated outlet optical beam to produce a factor-compensating signal;

i) feeding the signal to a second force secured to the means to apply a sufficient force to the second channel to change substantially and to change uniformly the index of refraction of the second channel sufficient to compensate for the phase change caused by the factor to be compensated;

j) feeding the signal to the first force means to apply sufficient force to uniformly change the index of refraction of the first channel sufficient to compensate for the phase change caused by the factor to be compensated; and k) recovering a factor-compensated, phase-modulated first optical beam from the outlet window.

12. The method of claim 11 wherein the tunnel of the second channel is composed of a temperature insensitive material to provide for a temperature compensated, phase modulated optical beam.

13. The method of claim 11 wherein the first and second force means comprise electrically operated plate means secured to the first and third channels of the optical material to apply a force to the optical material, and which method includes:

i) detecting the compensated outlet optical beam with a photo detector means which provides a voltage signal; and ii) feeding the voltage signal to the electrically operated plate means of the first and second force means.

14. The method of claim 11 wherein the optical material comprises a transparent optical material in generally rectangular slab form with piezoelectric plates secured to the top and bottom surface of the slab.

15. A temperature-compensating, phase-modulated optical beam system, which system comprises:
   a) a source of a first optical beam;
   b) a source of a second optical beam;
   c) a stress optical material having an inlet window to receive the first optical beam and second optical beam, and an outlet window to recover the first and second optical beams, the stress optic material adapted to change uniformly its indexed refraction in response to uniformly applied stress;
   d) a beam splitter means to divide the second optical beam into at least 2A and 2B optical beams for introduction into the inlet window;
   e) spaced apart, generally parallel first, second and third channels in the optical material, the second channel having a tunnel composed of a temperature-insensitive material, the first optical beam passing through the first channel, the beam 2A passing through the tunnel as a reference beam, and the beam 2B passing through the third channel;
   f) first and second force means each comprising strictive plates secured to the first and second channels of the optical material to place in response to electrical signals a predetermined force on the respective channels of the optical material to change substantially uniformly the index of refraction of the optical material throughout the optical material in response to electrical signals and to phase modulate the first and 2B optical beams;
   g) beam coupler means to recombine the optical beams 2A and 2B to provide a modulated optical beam;
   h) a photo detector means to receive the modulated optical beam and to produce an electrical signal responsive thereto;
   i) a feedback means electrically connected to the first force means and the second force means to apply a predetermined force to the first and second channels to temperature compensate the optical beam 2B and the first optical beam to provide a first optical phase-modulated, temperature-compensated optical beam.

16. The system of claim 15 wherein the optical material comprises a slab material having strictive plates secured on either side of the slab material.

17. The system of claim 15 wherein the plates are magneto, photo, piezo or electrostrictive plates.

18. The system of claim 15 wherein the temperature-insensitive material comprises athermal glass.

19. The system of claim 15 wherein the optical material is selected from the group consisting of a high lead content glass, acrylic, plastic and polystyrene plastic.

* * * * *